US012586427B2

(12) United States Patent
Brodt

(10) Patent No.: US 12,586,427 B2
(45) Date of Patent: Mar. 24, 2026

(54) METHOD AND DEVICE FOR RECORDING EVENT DATA IN A VEHICLE

(71) Applicant: Robert Bosch GmbH, Stuttgart (DE)

(72) Inventor: Andreas Markus Brodt, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 152 days.

(21) Appl. No.: 18/006,666

(22) PCT Filed: Aug. 31, 2021

(86) PCT No.: PCT/EP2021/073997
§ 371 (c)(1),
(2) Date: Jan. 24, 2023

(87) PCT Pub. No.: WO2022/063529
PCT Pub. Date: Mar. 31, 2022

(65) Prior Publication Data
US 2023/0282044 A1 Sep. 7, 2023

(30) Foreign Application Priority Data

Sep. 28, 2020 (DE) ..................... 10 2020 212 140.0

(51) Int. Cl.
*G06F 7/00* (2006.01)
*G06F 16/185* (2019.01)
(Continued)

(52) U.S. Cl.
CPC ........... *G07C 5/085* (2013.01); *G06F 16/185* (2019.01)

(58) Field of Classification Search
CPC .............................. G07C 5/085; G06F 16/185
(Continued)

(56) References Cited

U.S. PATENT DOCUMENTS

2007/0135979 A1* 6/2007 Plante .................. G08G 1/0175
701/33.4
2007/0135980 A1* 6/2007 Plante ...................... G07C 5/08
701/33.4
(Continued)

FOREIGN PATENT DOCUMENTS

CN 103098034 A 5/2013
CN 103559391 A 2/2014
(Continued)

OTHER PUBLICATIONS

International Search Report for PCT/EP2021/073997, Issued Dec. 22, 2021.

*Primary Examiner* — Pavan Mamillapalli
(74) *Attorney, Agent, or Firm* — NORTON ROSE FULBRIGHT US LLP

(57) ABSTRACT

A method for recording event data in a vehicle. Vehicle data are continuously received from at least one vehicle system and written as event data into data frames having a predefined size. The individual data frames are stored in at least one volatile memory. The stored data frames are managed and kept available in the at least one volatile memory until the event data stored in the individual data frames are older than a predefined maximum pre-event point in time, or are persistently stored in at least one nonvolatile memory in response to a recognized predefined event. Multiple partitions having a predefined size are provided, one of the partitions being determined, as a function of at least one write criterion, as the present write partition into which the received pieces of reference information of the individual data frames are written.

27 Claims, 5 Drawing Sheets

(51) Int. Cl.
*G06F 17/00* (2019.01)
*G07C 5/08* (2006.01)

(58) Field of Classification Search
USPC ........................................................ 707/651
See application file for complete search history.

(56) References Cited

U.S. PATENT DOCUMENTS

| | | | | |
|---|---|---|---|---|
| 2007/0150138 | A1* | 6/2007 | Plante | H04N 21/44 |
| | | | | 701/33.4 |
| 2010/0332072 | A1* | 12/2010 | Ishiko | B60T 17/221 |
| | | | | 701/29.5 |
| 2012/0113773 | A1* | 5/2012 | Matsuo | G07C 5/085 |
| 2014/0178031 | A1 | 6/2014 | Walker | |
| 2016/0162739 | A1 | 6/2016 | Ishiguri | |
| 2019/0311554 | A1 | 10/2019 | Ewert | |
| 2020/0058174 | A1 | 2/2020 | Wright | |

FOREIGN PATENT DOCUMENTS

| | | |
|---|---|---|
| CN | 110709899 A | 1/2020 |
| WO | 2009103387 A1 | 8/2009 |

* cited by examiner

Figure 1:
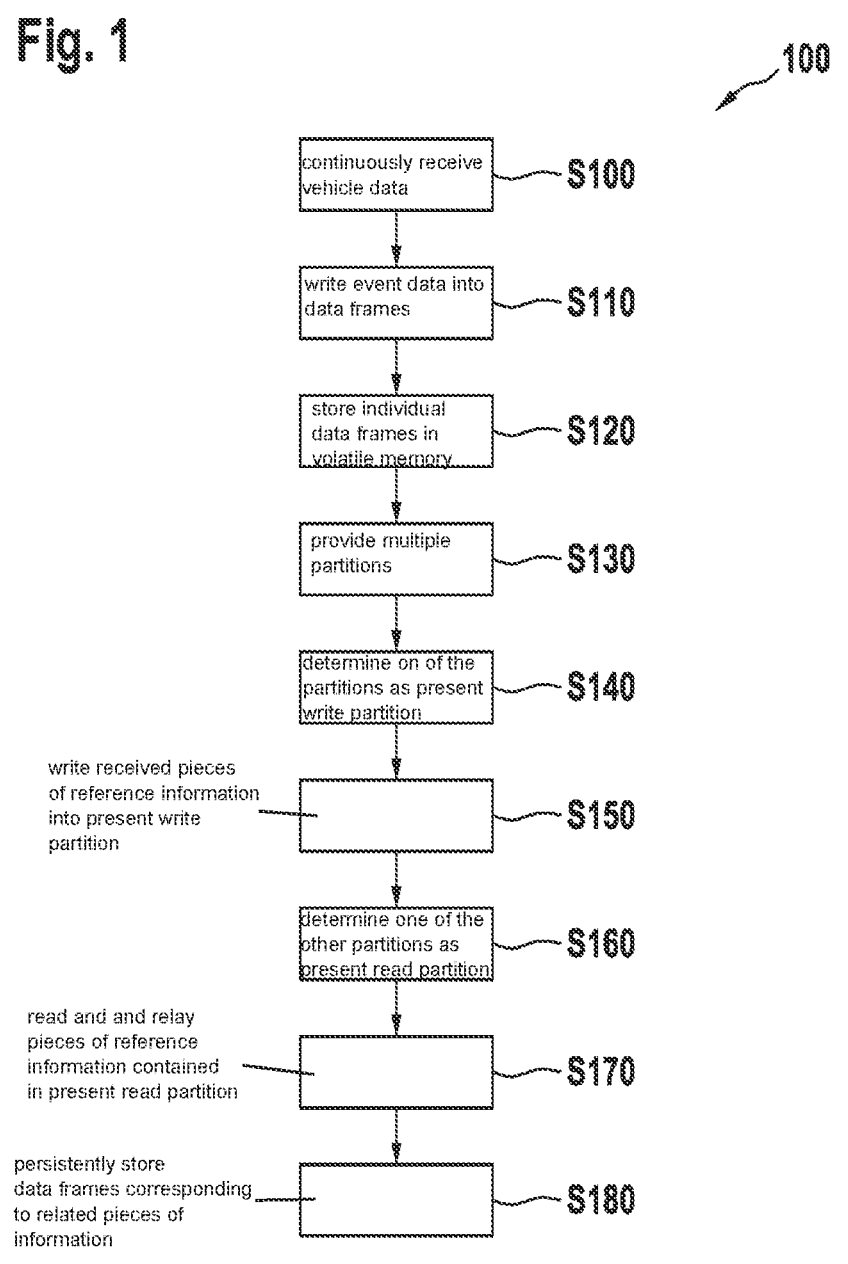

Fig. 1                                                                    100 continuously receive
vehicle data                    — S100 write event data into
data frames                     — S110 store individual
data frames in                  — S120
volatile memory provide multiple
partitions                      — S130 determine on of the
partitions as present           — S140
write partition write received pieces
of reference information
into present write                                — S150
partition determine one of the
other partitions as             — S160
present read partition read and and relay
pieces of reference
information contained                             — S170
in present read partition persistently store
data frames corresponding                        — S180
to related pieces of
information

|   | Epoch A | Epoch B | M |
|---|---|---|---|
| A | 2:00:00:000 | 8:00:00:000 | B |
| C | 16:00:00:000 | 8:00:00:000 | B |
| C | 16:00:00:000 | 8:00:00:000 | A |
| C | 16:00:00:000 | 8:00:00:000 | A |

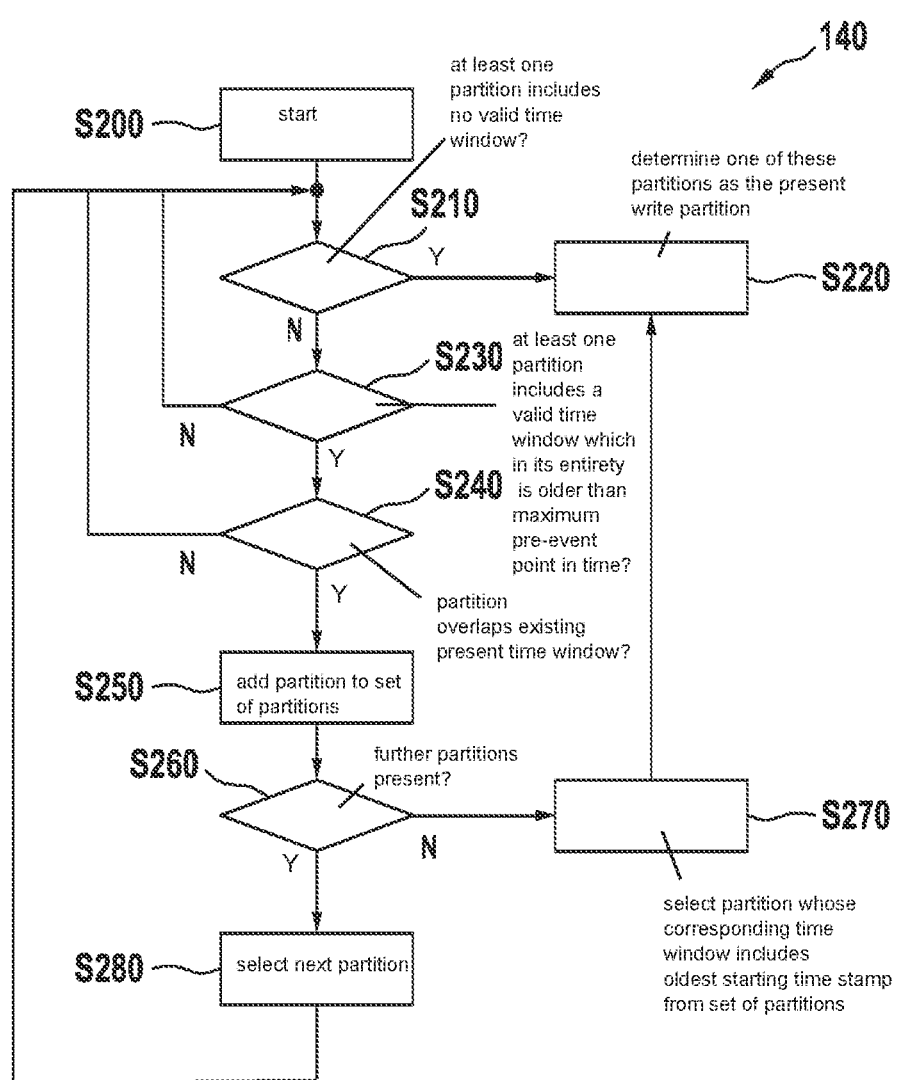

at least one
partition includes
no valid time
window?

determine one of these
partitions as the present
write partition

S200 — start

S210

S220

Y

N

S230 at least one
partition
includes a
valid time
window which
in its entirety
is older than
maximum
pre-event
point in time?

N

Y

S240

N

Y partition
overlaps existing
present time window?

S250 — add partition to set
of partitions

S260 — further partitions
present?

Y

N

S270

S280 — select next partition

140 select partition whose
corresponding time
window includes
oldest starting time stamp
from set of partitions

METHOD AND DEVICE FOR RECORDING EVENT DATA IN A VEHICLE

FIELD

The present invention is directed to a method for recording event data in a vehicle. Further subject matter of the present invention relates to a device and a computer program product for carrying out such a method for recording event data in a vehicle, and a computer-readable memory medium on which the computer program product is stored.

BACKGROUND INFORMATION

Highly automated driving facilitates greater traffic safety due to the absence of human error. At the same time, it increases the need for data capture in such vehicles with highly automated driving functions in the event that something goes wrong, so that all necessary information is available for subsequent analyses and product improvements. Therefore, methods for recording event data in such vehicles are used. Vehicle data are continuously received from at least one vehicle system and written as event data into data frames having a predefined size, the individual data frames being stored in at least one volatile memory. The stored data frames are managed and kept available in the at least one volatile memory until the event data stored in the individual data frames are older than a predefined maximum pre-event point in time, or are persistently stored in at least one nonvolatile memory in response to a recognized predefined event. A device for carrying out such a method for recording event data generally includes a data provision system, an event recognition system, and a data recording system.

SUMMARY

A method for recording event data in a vehicle according to the present invention has the advantage that only one present write partition which only one function may exclusively access is present, so that no other functions may access the present write partition and alter its data contents.

Specific example embodiments of the present invention provide a method for recording event data in a vehicle, vehicle data being continuously received from at least one vehicle system and written as event data into data frames having a predefined size. The individual data frames are stored in at least one volatile memory, the stored data frames being managed and kept available in the at least one volatile memory until the event data stored in the individual data frames are older than a predefined maximum pre-event point in time, or being persistently stored in at least one nonvolatile memory in response to a recognized predefined event. Multiple partitions having a predefined size are provided, one of the partitions being determined, as a function of at least one write criterion, as the present write partition into which the received pieces of reference information of the individual data frames are written.

Moreover, a device for carrying out such a method for recording event data in a vehicle is provided according to an example embodiment of the present invention, and includes a data provision system, a buffer block, an event recognition system, and a data recording system. The data provision system is designed to continuously receive vehicle data, to be recorded, from at least one vehicle system, to write the vehicle data as event data into data frames having a predefined size, and to store individual data frames in at least one volatile memory. According to an example embodiment of the present invention, the buffer block is designed to manage the stored data frames and keep them available in the at least one volatile memory until the event data stored in the individual data frames are older than a predefined maximum pre-event point in time, or to persistently store them in at least one nonvolatile memory in response to a predefined event that is recognized by the event recognition system. The buffer block includes a write function and multiple partitions having a predefined size, the write function being designed to determine, as a function of at least one write criterion, one of the partitions as the present write partition, and to write pieces of reference information of the individual data frames that are received from the data provision system into the present write partition.

Also advantageous is a computer program product according to an example embodiment of the present invention including program code that is stored on a machine-readable medium such as a semiconductor memory, a hard disk, or an optical memory, and used for carrying out the evaluation when the computer program is executed.

By use of the measures and refinements disclosed herein, advantageous enhancements and embodiments of the method of the present invention for recording event data in a vehicle, and of the device of the present invention for recording event data in a vehicle, are possible.

In the present context, the data provision system may be understood as a processing component that includes all processing steps from detecting the original vehicle data to organizing and storing the vehicle data as event data in volatile memory blocks, so that the event data may be kept available in the at least one volatile memory for a limited time period. In the present context, the event recognition system may be understood as a processing component that continuously monitors the state of the vehicle and decides when a preconfigured situation or a predefined event has occurred that requires permanent storage of predefined vehicle data. Such a predefined event may be, for example, a recognized malfunction of one of the vehicle systems, or a recognized collision of the vehicle with a stationary obstacle or some other vehicle. In the present context, the data recording system may be understood as a processing component that includes the processing steps for retrieving the available vehicle data in the at least one volatile memory, possibly carrying out further data transformations such as encryption, and ultimately, persistently storing the vehicle data in at least one nonvolatile memory.

For this purpose, the data provision system, the event recognition system, and the data recording system may each include at least one interface that may have a hardware and/or software design. In a hardware design, the at least one interface may be part of a so-called system ASIC, for example, which contains various functions of the data provision system. However, it is also possible for the interfaces to be dedicated, integrated circuits, or to be at least partially made up of discrete components. In a software design, the interfaces may be software modules that are present, for example, on a microcontroller in addition to other software modules.

Via the at least one interface, the data provision system may receive the vehicle data, to be recorded, from the at least one vehicle system, which may be designed, for example, as a surroundings detection system or as a person protection system or as a vehicle dynamics system or as a braking system, for example. In addition, the data provision system may be connected to the at least one volatile memory via at least one interface in order to keep the received vehicle data available in the at least one volatile memory for a limited time period. Furthermore, the data provision system may include further components for preparing and preprocessing the received vehicle data. Via the at least one interface, the event recognition system may receive vehicle data or information from the at least one vehicle system and evaluate the received vehicle data or information in order to recognize relevant events. Thus, the data provision system or the event recognition system may, for example, be coupled to a vehicle data bus in each case, so that the data provision system or the event recognition system may receive vehicle data and information from a plurality of vehicle systems that are connected to the vehicle data bus.

The data recording system may be connected to the at least one volatile memory via the at least one interface in order to read out the data to be persistently stored. In addition, the data recording system may be connected to the at least one nonvolatile memory via the at least one interface in order to store the data, to be persistently stored, in the at least one nonvolatile memory.

In the present context, the buffer block may be understood as a component that establishes the connection between the data provision system, the event recognition system, and the data recording system. According to an example embodiment of the present invention, the buffer block maintains the vehicle data, provided by the data provision system, in the at least one volatile memory until the data are too old to be relevant for an event. In this case, the buffer block frees up the memory area that is used in the at least one volatile memory for vehicle data that are now outdated, so that this memory area may be reused by the data provision system for storing newer vehicle data. Alternatively, the event recognition system notifies the buffer block that all vehicle data from a certain detection time window of the data recording system are to be provided. In this case, the buffer block ensures that all vehicle data of the predefined present event time window remain available until the data recording system has completely persistently stored these vehicle data in the at least one nonvolatile memory. This also includes the boundary case that the data recording system stores the vehicle data so slowly that the vehicle data for newer events have become outdated in the meantime. Even then, the buffer block is not allowed to free up or overwrite the corresponding memory area in the at least one volatile memory.

The data provision system, the event recognition system, and the data recording system may be distributed over multiple components in the vehicle that are connected to one another via a suitable vehicle network infrastructure. For example, the data provision system may be implemented on multiple "data sources," such as processor units, which may relay the vehicle data to other devices in the vehicle that may carry out the event recognition and further postprocessing steps and that may contain the buffer block, while further postprocessing steps and the data storage may be carried out on a further processor unit. The data provision, event recognition, and data recording may be carried out in separate runs. In addition, the device or hardware on which the method for recording event data in a vehicle is carried out may provide multiple CPU cores or multiple processors that may actually execute these runs in parallel. The buffer block may separate call-ups by the data recording system, the event recognition system, and the data provision system from one another, so that the results in any parallel execution are always correct. Furthermore, the data provision system may call up the buffer block in multiple parallel runs. The data recording system is executed in an individual run; i.e., the buffer block does not have to separate individual call-ups by the data recording system from one another. The interface processes provided by the buffer block are called up by the interface components, and therefore run in their respective runs.

According to an example embodiment of the present invention, it is particularly advantageous that one of the other partitions may be determined as the present read partition in response to a request and as a function of at least one predefined read criterion, which includes at least one present event time window for which the event data are to be persistently recorded. This means that the present write partition, which may be marked by a write partition indicator, for example, cannot be determined as the present read partition which may be marked by a read partition indicator, for example. Pieces of reference information from data frames contained in the present read partition, containing event data to be persistently recorded, may be read out and relayed. The data frames corresponding to the relayed pieces of reference information may be persistently stored in the at least one nonvolatile memory. By use of the single read partition, which may be exclusively accessed by only one function, the situation that other functions may access the present read partition and alter its data contents may advantageously be prevented.

In one advantageous embodiment of the method of the present invention, a starting point in time of the present event time window may be predefined as a time stamp with regard to a present zero reference point in time. An ending point in time of the present event time window may be predefined as a time difference from the starting point in time, it being possible to redefine the present zero reference point in time if necessary. A first zero reference point in time may correspond to a starting point in time of the vehicle. The method for recording event data in a vehicle does not have to occupy itself with an event that is chronologically prior to the start of the present trip. Therefore, the zero reference point in time also does not have to be prior to the start of a trip. The present zero reference point in time may be redefined, for example, when a new present event time window is not representable using the present zero reference point in time due to the fact that the starting point in time of the new present event time window is temporally too far from the present zero reference point in time. A time window may generally be represented as two absolute points in time, i.e., as two time stamps, a starting time stamp and an ending time stamp. Representing such a time stamp requires 32 bits, so that 64 bits are necessary for representing a time window. A 32-bit processor can read or write only 32 bits atomically, i.e., in a machine instruction, so that 64 more bits are necessary than for a machine instruction that is not atomic. To represent present event time window in 32 bits and thus provide a nonblocked atomic implementation of the present event time window, the starting time stamp and a time difference with regard to the starting time stamp are used instead of two time stamps for defining the present event time window. The length of the present event time window will presumably be in the order of minutes. Thus, instead of using two complete time stamps for the starting point in time and the ending point in time of the present event time window, bits may be saved by storing only the starting time stamp of the present event time window and the duration of the present event window stored. Thus, for example, using a 32-bit processor, with a resolution of 0.1 s the present event time window, with 17 bits for the starting time stamp and with 14 bits for the duration or length of the present event time window, may be read or stored using an atomic machine instruction. The starting point in time of the present event time window may be expressed, for example, up to a maximum value of 3.6 hours after the present zero reference point in time, and the duration or length of the present event time window may be expressed up to a maximum value of 27.3 minutes or 1.638 seconds.

In a further advantageous embodiment of the method of the present invention, the individual data frames may relate to a time window. The pieces of reference information of the individual data frames may each include a corresponding memory area and the corresponding time window with a starting time stamp and an ending time stamp of the individual data frames in which at least one data segment of the event data contained in the corresponding data frame has been generated or detected. It may thus be easily and quickly checked whether the data frame contains event data or vehicle data whose generation or detection overlaps with the present event time window. In addition, the starting time stamp and the ending time stamp of the individual data frames may be based on the present zero reference point in time.

In a further advantageous embodiment of the method of the present invention, a time window may be associated with the individual partitions in each case. An oldest starting time stamp of pieces of reference information of a corresponding data frame contained in the partition may be used as the starting time stamp of the time window of a corresponding partition. A most recent ending time stamp of pieces of reference information of a corresponding data frame contained in the partition may be used as the ending time stamp of the time window of the corresponding partition. It may thus be easily and quickly checked whether the corresponding partition overlaps with the present event time window.

In a further advantageous embodiment of the method of the present invention, the pieces of reference information from at least one data frame whose time window overlaps with the present event time window may be read out from the present read partition. In addition, the time window of the at least one data frame in the pieces of reference information may be invalidated after the pieces of reference information are read out. Reading out the pieces of reference information from a data frame multiple times, and persistently storing the corresponding data frame multiple times in the at least one nonvolatile memory, may thus be prevented.

In a further advantageous embodiment of the method of the present invention, the existing present event time window may be locally stored prior to determining the present read partition. Prior to each operation of reading out the pieces of reference information from at least one data frame, the locally stored present event time window may be compared to the present event time window, and the present event time window may be locally stored if it differs from the locally stored present event time window. In addition, it may be checked whether the time window of the present read partition and the new present event time window overlap when the locally stored present event time window has been altered. The readout operation of the read partition may be restarted if the present read partition overlaps with the altered present event time window. This means that the present read partition is read anew from the beginning. Pieces of reference information that have already been read out are not read out again, since the time window of the corresponding data frame in the pieces of reference information has been invalidated after the pieces of reference information are read out. Alternatively, a new present read partition may be determined if the present read partition does not overlap with the altered present event time window.

This means that the readout operation of the present read partition that corresponds to the present event time window, which has become outdated in the meantime, is aborted and not restarted. As a result, at the most, pieces of reference information from a data frame whose time window is now outside the new present event time window are relayed to the data recording system. However, this behavior is as if the event recognition system had not established the new present event time window until after the readout operation had read out the pieces of reference information of this data frame, and is therefore tolerable.

In a further advantageous embodiment of the method of the present invention, as a function of the at least one predefined write criterion, a new write partition may be searched for when the vehicle is restarted or the present write partition is completely written with reference information. For this purpose, for example, a set of partitions which have no valid time window may be determined. This means that these partitions contain no reference information from data frames, so that no conflict between the determining of the present write partition and the determining of the present read partition may result. Since these partitions contain no reference information from data frames, an attempt is also not made to use these partitions as present read partitions. Therefore, one of these partitions may be determined as the present write partition. Additionally or alternatively, partitions may be determined that have a valid time window which in its entirety is older than the maximum pre-event point in time and does not overlap an existing present event time window. This means that no event that may occur in the future still needs the data frames of the particular partition, and that the partition at the moment is also not relevant as a read partition, and all pieces of reference information from data frames that overlap the present event window have not yet been completely read out, even if they already extend beyond the maximum pre-event point in time. A partition that has no valid time window, or a partition as a present write partition whose corresponding valid time window has the oldest starting time stamp, may be determined from this set of partitions. In addition, the existing present event time window may be locally stored prior to determining the present write partition. In this way, prior to determining the present write partition it may be checked whether the present event time window has changed. When the new present write partition is determined, the write partition indicator may be reset according to an atomic machine instruction.

In a further advantageous embodiment of the method of the present invention, the received pieces of reference information of the individual data frames may be written into the present write partition in an arbitrary temporal sequence. Temporally randomly sorted subsequences of the written pieces of reference information of the individual data frames in the write partition may be ascertained and marked. For this purpose, the written pieces of reference information of the individual data frames may be consecutively numbered in ascending order according to their write sequence.

In a further advantageous embodiment of the method of the present invention, with each writing of pieces of reference information of a new data frame, the time window of the new data frame may be compared to the time window of the data frame whose pieces of reference information have previously been last written into the write partition.

In a further advantageous embodiment of the method of the present invention, for example the starting time stamp of the new data frame may be compared to the starting time stamp of the most recently written data frame, it being possible to recognize and continue a temporally randomly sorted present start time subsequence if the starting time stamp of the new data frame is more recent than the starting time stamp of the last written data frame. Alternatively, a new start time subsequence may be started, and its starting time stamp may be marked by storing the corresponding numbering of the new data frame if the starting time stamp of the new data frame is older than the starting time stamp of the last written data frame. In addition, a first start time subsequence may start with the starting time stamp of the first written data frame. This means that the smallest number in the ascending numbering simultaneously marks the start of the first temporally randomly sorted present start time subsequence.

In a further advantageous embodiment of the method of the present invention, the ending time stamp of the new data frame may be compared to the ending time stamp of the last written data frame, it being possible to recognize and continue a temporally randomly sorted present end time subsequence when the ending time stamp of the new data frame is more recent than the ending time stamp of the last written data frame. Alternatively, a new end time subsequence may be started, and its ending time stamp may be marked by storing corresponding numbering of the new data frame if the ending time stamp of the new data frame is older than the ending time stamp of the last written data frame. In addition, a first end time subsequence may start with the ending time stamp of the first written data frame. This means that the smallest number in the ascending numbering simultaneously marks the start of the first temporally randomly sorted present end time subsequence.

In a further advantageous embodiment of the method of the present invention, pieces of reference information from at least one data frame to be read out from the present read partition may be ascertained for the present event time window as a function of the temporal reference of the at least one temporally randomly sorted start time subsequence and/or the at least one temporally randomly sorted end time subsequence of the present read partition. Due to introducing the temporally randomly sorted start time subsequences and the temporally randomly sorted end time subsequences, finding the pieces of reference information from data frames to be read out may be speeded up, since the pieces of reference information do not always have to be checked by all data frames contained in the present read partition.

In one advantageous embodiment of the device of the present invention, the buffer block may include a read function which, in response to a request of the data recording system and as a function of at least one predefined read criterion that includes at least one present event time window for which the event data are to be persistently recorded, is designed to determine one of the other partitions as the present read partition, and to read out pieces of reference information from data frames contained in the present read partition and which contain event data to be persistently recorded, and to relay them to the data recording system. The data recording system may be designed to persistently store data frames, corresponding to the relayed pieces of reference information, in the at least one nonvolatile memory.

In a further advantageous embodiment of the device of the present invention, the write function may be further designed to write the received pieces of reference information of the individual data frames into the present write partition in an arbitrary temporal sequence, and to ascertain and mark temporally randomly sorted subsequences of the written pieces of reference information of the individual data frames in the present write partition.

In a further advantageous embodiment of the device of the present invention, the event recognition system may be designed to continuously monitor the state of the vehicle and to decide when a predefined event has occurred that requires the persistent storage of the corresponding event data of the at least one vehicle system. The event recognition system may be further designed to output the present event time window, corresponding to the recognized event for which the event data are to be persistently recorded, to the buffer block, a starting point in time of the present event time window not being chronologically prior to the maximum pre-event point in time. In addition, the event recognition system may be further designed to predefine the starting point in time of the present event time window as a time stamp with regard to a present zero reference point in time, and to predefine an ending point in time of the present event time window as a time difference from the starting point in time, it being possible for the buffer block to be designed to redefine the present zero reference point in time if necessary.

Exemplary embodiments of the present invention are illustrated in the figures and explained in greater detail in the following description. Components or elements that carry out identical or analogous functions are denoted by the same reference numerals in the figures.

BRIEF DESCRIPTION OF THE DRAWINGS

FIG. 1 shows a schematic flow chart of one exemplary embodiment of a method according to the present invention for recording event data in a vehicle.

FIG. 6 shows a schematic flow chart of an operation for determining a present write partition for an example embodiment of the method according to the present invention for recording event data in a vehicle from FIG. 1.

DETAILED DESCRIPTION OF EXAMPLE EMBODIMENTS

Figure 2:
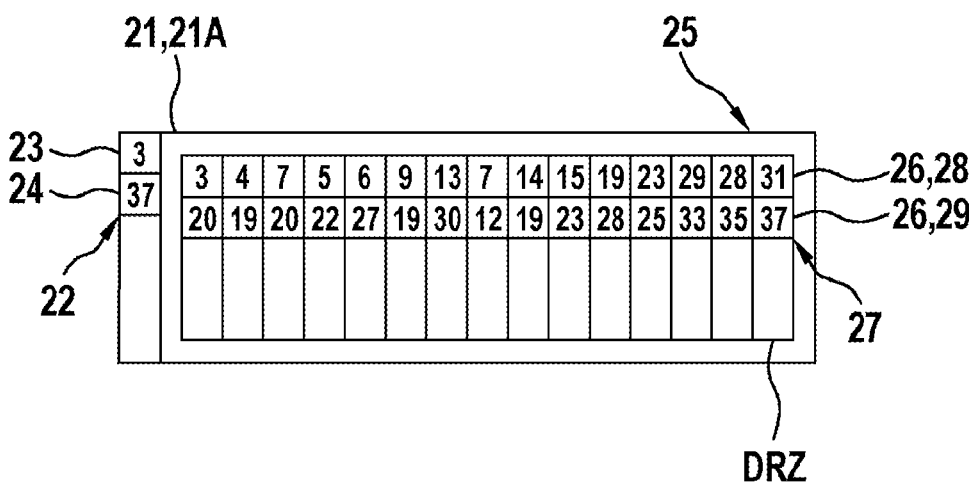
FIG. 2 shows a schematic illustration of a first exemplary embodiment of a partition for the method according to the present invention for recording event data in a vehicle from FIG. 1.

As is apparent from FIG. 1, in the illustrated exemplary embodiment of a method 100 according to the present invention for recording event data in a vehicle, vehicle data are continuously received from at least one vehicle system 3 in a step S100, and are written as event data into data frames DR having a predefined size, in step S110. Individual data frames DR are stored in at least one volatile memory 50 in step S120, stored data frames DR being managed and kept available in the at least one volatile memory 50 until the event data stored in individual data frames DR are older than a predefined maximum pre-event point in time, or being persistently stored in at least one nonvolatile memory 46 in response to a recognized predefined event. For this purpose, multiple partitions 21, 21A, 21B having a predefined size are provided in step S130, one of partitions 21, 21A, 21B being determined as the present write partition in step S140 as a function of at least one write criterion, and received pieces of reference information 25 of individual data frames DR being written into the present write partition in step S150.

In the illustrated exemplary embodiment of method 100 according to the present invention, one of the other partitions 21, 21A, 21B is determined as the present read partition in step S160 in response to a request and as a function of at least one predefined read criterion that includes at least one present event time window EZF for which the event data are to be persistently recorded. Pieces of reference information 25 from data frames DR contained in the present read partition, containing event data to be persistently recorded, are read out and relayed in step S170, and data frames DR corresponding to relayed pieces of reference information 25 are persistently stored in the at least one nonvolatile memory 46 in step S180.

In the illustrated exemplary embodiments, individual data frames DR in each case relate to a time window 27. As is further apparent from FIGS. 2 and 3, pieces of reference information 25 of individual data frames DR in each case include a corresponding memory area, which is preferably represented by a data frame indicator DRZ, and corresponding time window 27 with a starting time stamp 28 and an ending time stamp 29 of individual data frames DR in which at least one data segment of the event data in corresponding data frame DR has been generated or detected.

Figure 3:
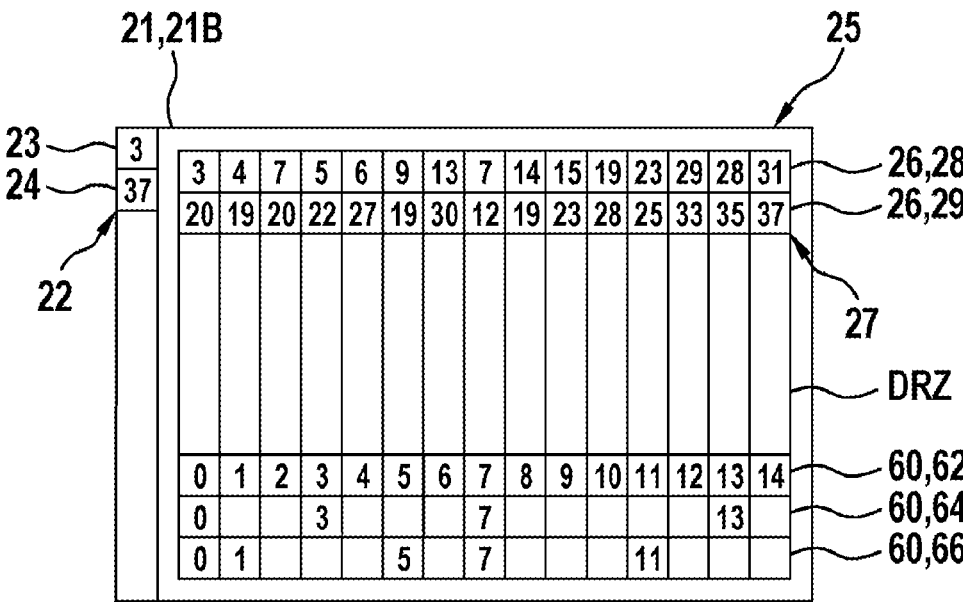
FIG. 3 shows a schematic illustration of a second exemplary embodiment of a partition for the method according to the present invention for recording event data in a vehicle from FIG. 1.

As is further apparent from FIGS. 2 and 3, a time window 22 is assigned to individual partitions 21, 21A, 21B in each case, an oldest starting time stamp 28 of pieces of reference information 25 of a corresponding data frame DR contained in partition 21 being used as starting time stamp 23 of time window 22 of a corresponding partition 21, 21A, 21B. A most recent ending time stamp 29 of pieces of reference information 25 of a corresponding data frame DR contained in partition 21, 21A, 21B is used as ending time stamp 24 of time window 22 of corresponding partition 21, 21A, 21B. As is further apparent from FIGS. 2 and 3, illustrated completely written partitions 21A, 21B each include the pieces of reference information from fifteen data frames DR, each of which relates to a corresponding time window 27. Time windows 22 of illustrated partitions 21A, 21B each have, by way of example, the value "3" of starting time stamp 28 of a first data frame DR, which corresponds to oldest starting time stamp 28 in illustrated partitions 21A, 21B. As ending time stamp 24, illustrated partitions 21A, 21B each have, by way of example, the value "37" of ending time stamp 29 of last data frame DR, which corresponds to most recent ending time stamp 29 in illustrated partitions 21A, 21B.

Figures 4, 5:
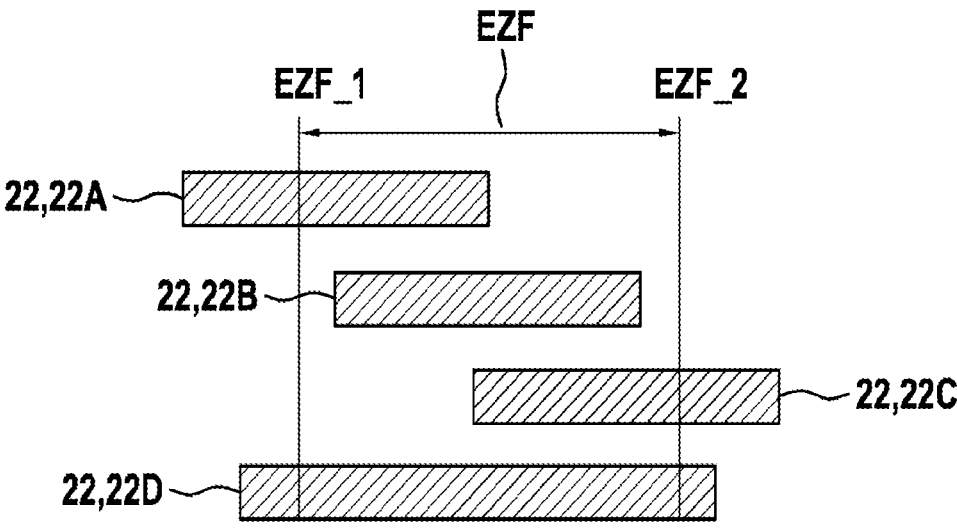
FIG. 4 shows a schematic illustration of a first exemplary embodiment of a present event time window and multiple exemplary embodiments of partition time windows for the method according to an example embodiment of the present invention for recording event data in a vehicle from FIG. 1.
FIG. 5 shows a tabular representation of a memory area during a redefinition of a present zero reference point in time for an example embodiment of the method according to the present invention for recording event data in a vehicle from FIG. 1.

In the illustrated exemplary embodiments, a starting point in time EZF_1 of present event time window EZF, illustrated in FIG. 4, is predefined as a time stamp with regard to a present zero reference point in time B illustrated in FIG. 5. An ending point in time EZF_2 of present event time window EZF is predefined as a time difference from starting point in time EZF_1, present zero reference point in time B being redefined if necessary. For example, present zero reference point in time B is redefined when a new present event time window EZF is not representable by present zero reference point in time B due to the fact that starting point in time EZF_1 of new present event time window EZF is temporally too far from present zero reference point in time B. In addition, starting time stamp 28 and ending time stamp 29 of individual data frames DR, and thus also starting time stamp 23 and ending time stamp 24 of individual partitions 21, 21A, 21B, are also based on present zero reference point in time B.

The process for redefining zero reference point in time B is described below with reference to FIG. 5. As is apparent from FIG. 5, the two last used zero reference points in time A, B are stored at a memory space epoch A, epoch B, respectively, in present event time window EZF it being indicated, by a marker M in a corresponding memory space, which of the two stored zero reference points in time A, B starting point in time EZF_1 of present event time window EZF relates to. An oldest zero reference point in time generally corresponds to a starting point in time of the vehicle. In the illustrated exemplary embodiment, present event time window EZF is encoded in 32 bits. Bits 0 through 13 represent the duration or length of present event time window EZF, and bits 14 through 30 represent starting point in time EZF_1 of present event time window EZF as a time difference of starting point in time EZF_1 of present event time window EZF from present zero reference point in time B. Bit 31 represents the marker of presently valid zero reference point in time B. Thus, the validity of zero reference point in time A stored in memory space epoch A may be marked by a logical value "$_0$," for example, and the validity of zero reference point in time B stored in memory space epoch B may be marked by a logical value "1," for example. In FIG. 5, the second row of the table shows a present state of the corresponding memory area. This means that an older first zero reference point in time A, having the value 2:00:00:000 as an example, is stored in memory space epoch A, and a more recent second zero reference point in time B, having the value 8:00:00:000, is stored in memory space epoch B, marker M having the illustrated value "B" indicating that more recent second zero reference point in time B stored in memory space epoch B corresponds to present zero reference point in time B. An oldest zero reference point in time corresponds to a starting point in time of the vehicle.

As is further apparent from FIG. 5, when presently used zero reference point in time B is redefined, older zero reference point in time A of the two stored zero reference points in time A, B is initially overwritten by a new zero reference point in time C. In FIG. 5, the third row of the table shows this state of the corresponding memory area. This means that new zero reference point in time C, having the value 16:00:00:000 as an example, is stored in memory space epoch A. Second zero reference point in time B, which is now older, having the value 8:00:00:000 is still stored in memory space epoch B, marker M having the illustrated value "B" still indicating that second zero reference point in time B stored in memory space epoch B corresponds to present zero reference point in time B. New zero reference point in time C is then marked as present zero reference point in time C in an atomic operation. In FIG. 5, the fourth row of the table shows this state of the corresponding memory area. This means that new zero reference point in time C having the value 16:00:00:000 as an example is stored in memory space epoch A. Second zero reference point in time B, which is now older, having the value 8:00:00:000 is still stored in memory space epoch B, marker M having the illustrated value "A" now indicating that new zero reference point in time C stored in memory space epoch A now corresponds to present zero reference point in time C. New present event time window EZF is subsequently atomically written, based on new present zero reference point in time C. In FIG. 5, the fifth row of the table shows the state of the corresponding memory area after present zero reference point in time C is redefined.

Operation 140 carried out in step S140 for determining a present write partition for method 100 according to the present invention for recording event data in a vehicle is described below with reference to FIG. 6. As a function of the at least one predefined write criterion, a new write partition is searched for when the vehicle is restarted or the present write partition is completely written with pieces of reference information 25. In the illustrated exemplary embodiments, present event time window EZF, if present, is locally stored prior to determining the present write partition. As is further apparent from FIG. 6, determination operation 140 is started in step S200. It is checked in step S210 whether at least one of partitions 21, 21A, 21B includes no valid time window 22. If this is the case, one of these partitions 21, 21A, 21B is then determined as the present write partition in step S220, and the determination operation is ended. If no partition 21, 21A, 21B including an invalid time window 22 is recognized in step S210, it is then checked in step S230 whether at least one of partitions 21, 21A, 21B includes a valid time window 22 which in its entirety is older than the maximum pre-event point in time. If no such partition 21, 21A, 21B is recognized in step S230, determination operation 140 then returns to the check in step S210. If such a partition 21, 21A, 21B including a valid time window 22 is recognized in step S230, it is then checked in step S240 whether or not this partition overlaps an existing present event time window EZF. If it is established in step S240 that this partition 21, 21A, 21B overlaps an existing present event time window EZF, determination operation 140 then likewise returns to the check in step S210. If in step S240 no present event time window EZF is recognized, or it is established that this partition 21, 21A, 21B does not overlap an existing present event time window EZF, this partition 21, 21A, 21 is then added to a set of partitions 21, 21A, 21B in step S250. It is checked in step S260 whether even further partitions 21, 21A, 21B are present. If this is the case, next partition 21, 21A, 21B is then selected in step S280, and determination operation 140 is continued with the check in step S210. If no further partition 21, 21A, 21B is recognized in step S270, partition 21, 21A, 21B whose corresponding valid time window 22 includes the oldest starting time stamp 23 is selected from the set of partitions 21, 21A, 21B in step S270. This selected partition 21, 21A, 21B is then determined as the present write partition in step S220, and the determination operation is ended.

In the illustrated exemplary embodiments of the present invention, received pieces of reference information 25 of individual data frames DR are written into the present write partition in an arbitrary temporal sequence, temporally randomly sorted subsequences of written pieces of reference information 25 of individual data frames DR being ascertained in the write partition and marked. For this purpose, individual partitions 21, 21B additionally include auxiliary information 60, as is further apparent from FIG. 3. In contrast to partition 21A illustrated in FIG. 2, written pieces of reference information 25 of individual data frames DR of partition 21B illustrated in FIG. 3 have numbering 62. This means that pieces of reference information 25 of individual data frames DR of partition 21B illustrated in FIG. 3 are consecutively numbered in ascending order.

Upon each writing of pieces of reference information 25 of a new data frame DR, time window 27 of new data frame DR is compared to time window 27 of data frame DR whose pieces of reference information 25 have previously been last written into the present write partition. For this purpose, starting time stamp 28 of new data frame DR is compared to starting time stamp 28 of last written data frame DR. A temporally randomly sorted present start time subsequence 64 is recognized and continued if starting time stamp 28 of new data frame DR is more recent than starting time stamp 28 of last written data frame DR. Alternatively, a new start time subsequence 64 is started, and its starting time stamp 28 is marked by storing corresponding numbering 62 of new data frame DR if starting time stamp 28 of new data frame DR is older than starting time stamp 28 of last written data frame DR. A first start time subsequence 64 starts with starting time stamp 28 of first written data frame DR and the number "0." In addition, ending time stamp 29 of new data frame DR is compared to ending time stamp 29 of last written data frame DR. A temporally randomly sorted present end time subsequence 66 is recognized and continued if ending time stamp 29 of new data frame DR is more recent than ending time stamp 29 of last written data frame DR. Alternatively, a new end time subsequence 64 is started, and its ending time stamp 29 is marked by storing corresponding numbering 62 of new data frame DR if ending time stamp 29 of new data frame DR is older than ending time stamp 29 of last written data frame DR. A first end time subsequence 66 starts with ending time stamp 29 of first written data frame DR.

As is further apparent from FIG. 3, partition 21B illustrated by way of example includes four start time subsequences 64. First start time subsequence 64 starts with a lowest number "0" of ascending numbering 62. A second start time subsequence 64 starts with a number "3," since starting time stamp 28 of corresponding data frame DR, having the value "5," is older than starting time stamp 28 having the value "7" of preceding data frame DR. A third start time subsequence 64 starts with a number "7" of ascending numbering 62, since starting time stamp 28 of corresponding data frame DR, having the value "7," is older than starting time stamp 28 having the value "13" of preceding data frame DR. A fourth start time subsequence 64 starts with a number "13" of ascending numbering 62, since starting time stamp 28 of corresponding data frame DR, having the value "28," is older than starting time stamp 28 having the value "29" of preceding data frame DR. In addition, partition 21B illustrated by way of example includes five end time subsequences 66. First end time subsequence 66 starts with the lowest number "0" of ascending numbering 62. A second end time subsequence 66 starts with a number "1," since ending time stamp 29 of corresponding data frame DR, having the value "19," is older than ending time stamp 29 having the value "20" of preceding data frame DR. A third end time subsequence 66 starts with a number "5," since ending time stamp 29 of corresponding data frame DR, having the value "19," is older than ending time stamp 29 having the value "27" of preceding data frame DR. A fourth end time subsequence 66 starts with a number "7," since ending time stamp 29 of corresponding data frame DR, having the value "12," is older than ending time stamp 29 having the value "30" of preceding data frame DR. A fifth end time subsequence 66 starts with a number "11," since ending time stamp 29 of corresponding data frame DR, having the value "25," is older than ending time stamp 29 having the value "28" of preceding data frame DR.

FIG. 4 shows by way of example four time windows 22A, 22B, 22C, 22D of partitions 21, 21A, 21B, which overlap with present event time window EZF. Since all illustrated time windows 22A, 22B, 22C, 22D overlap present event time window EZF, all corresponding partitions 21, 21A, 21B are suitable for being determined as the present read partition. Since time window 22A, 22B, 22C, 22D of the present read partition overlaps present event time window EZF, at least one data frame DR of the present read partition also overlaps present event time window EZF. Pieces of reference information 25 from at least one data frame DR whose time window 27 overlaps with present event time window EZF are read out from the present read partition. Time window 27 of the at least one data frame DR in pieces of reference information 25 is invalidated after pieces of reference information 25 are read out.

Before the present read partition is determined, existing present event time window EZF is locally stored, locally stored present event time window EZF being compared to present event time window EZF prior to each readout operation of pieces of reference information 25 from at least one data frame DR. Present event time window EZF is locally stored if it differs from locally stored present event time window EZF. In addition, it is checked whether time window 22 of the present read partition and new present event time window EZF overlap when locally stored present event time window EZF has been altered. The readout operation of the read partition is restarted if the present read partition overlaps with altered present event time window EZF. Alternatively, a new present read partition is determined if the present read partition does not overlap with altered present event time window EZF.

To speed up the readout operation, pieces of reference information 25 from at least one data frame DR to be read out from the present read partition are ascertained for present event time window EZF as a function of the temporal reference of the at least one temporally randomly sorted start time subsequence 64 and/or the at least one temporally randomly sorted end time subsequence 66 of the present read partition.

As is further apparent from FIG. 4, starting time stamp 23 of a first time window 22 of a corresponding partition 21, 21A, 21B is outside present event time window EZF, and ending time stamp 24 of first time window 22 of corresponding partition 21, 21A, 21B is within present event time window EZF. Therefore, partition 21, 21A, 21B may contain data frames DR that are too old for present event time window EZF, but that contain no data frames DR that are too recent for present event time window EZF. Thus, for ascertaining pieces of reference information 25 from data frames DR to be read out from partition 21, 21A, 21B, only ending time stamp 29 of data frames DR of marked, temporally randomly sorted end time subsequences 66 are compared to starting point in time EZF_1 of present event time window EZF in order to recognize data frames DR that are completely prior to present event time window EZF.

As is further apparent from FIG. 4, starting time stamp 23 and ending time stamp 24 of a second time window 22B of a corresponding partition 21, 21A, 21B are within present event time window EZF. Therefore, partition 21, 21A, 21B contains neither data frames DR that are too old for present event time window EZF nor data frames DR that are too recent for present event time window EZF, so that pieces of reference information 25 from all data frames DR in corresponding partition 21, 21A, 21B are read out without further checking and relayed, and corresponding data frames DR are persistently stored.

As is further apparent from FIG. 4, starting time stamp 28 of a third time window 22C of a corresponding partition 21, 21A, 21B is within present event time window EZF, and ending time stamp 29 of third time window 22C of corresponding partition 21, 21A, 21B is outside present event time window EZF. Therefore, partition 21, 21A, 21B may contain data frames DR that are too recent for present event time window EZF, but may contain no data frames DR that are too old for present event time window EZF. Thus, for ascertaining pieces of reference information 25 from data frames DR to be read out from partition 21, 21A, 21B, only starting time stamp 28 of marked, temporally randomly sorted start time subsequences 64 is compared to ending point in time EZF_2 of present event time window EZF in order to recognize data frames DR that are completely after present event time window EZF.

As is further apparent from FIG. 4, starting time stamp 28 and ending time stamp 29 of a fourth time window 22D of a corresponding partition 21, 21A, 21B are outside present event time window EZF. Therefore, partition 21, 21A, 21B may contain data frames DR that are too recent for present event time window EZF, and may contain data frames DR that are too old for present event time window EZF. Thus, for ascertaining pieces of reference information 25 from data frame DR to be read out from partition 21, 21A, 21B, starting time stamp 28 of marked, temporally randomly sorted start time subsequences 64 is compared to ending point in time EZF_2 of present event time window EZF in order to recognize data frames DR that are completely after present event time window EZF. In addition, ending time stamps 29 of marked, temporally randomly sorted end time subsequences 66 are each compared to starting point in time EZF_1 of present event time window EZF in order to recognize data frames DR that are completely prior to present event time window EZF.

Randomly sorted end time subsequences 66 are initially used to find a data frame DR that is not completely prior to event time window EZF. For this purpose, ending time stamp 29 of data frame DR of the last entry of a first randomly sorted end time subsequence 66 is initially compared to starting point in time EZF_1 of present event time window EZF in order to check whether data frames DR of first randomly sorted end time subsequence 66 are completely prior to event time window EZF. If the answer is yes, the operation is then continued with next randomly sorted end time subsequence 66, and pieces of reference information 25 of data frames DR of first randomly sorted end time subsequence 66 are not relayed. If the answer is no, beginning with the first entry, ending time stamps 29 of data frames DR of first randomly sorted end time subsequence 66 are checked to find a data frame DR that is not completely prior to event time window EZF, since earlier entries of data frame DR of randomly sorted first end time subsequence 66 in their entirety may be older than present event time window EZF. After the number of a first such data frame DR is ascertained, corresponding randomly sorted start time subsequence 64 that contains this first data frame DR is. To ensure that data frames DR are not completely after event time window EZF, beginning with starting time stamp 28 of ascertained first data frame DR, starting time stamps 28 of data frames DR of first randomly sorted start time subsequence 64 are compared to ending point in time EZF_2 of present event time window EZF in order to find a data frame DR that is completely after event time window EZF. If a data frame DR is found that is completely after present event time window EZF, the operation is then continued with a first entry of next randomly sorted start time subsequence 64. In addition, each time a data frame DR is found that overlaps with present event time window EZF, it is checked whether found data frame DR still belongs to previously checked randomly sorted end time subsequence 66. If this is the case, pieces of reference information 25 of found data frame DR are relayed, and time window 27 in pieces of reference information 25 of data frame DR in partition 21 is deleted. Otherwise, the operation is continued with randomly sorted end time subsequence 66 to which found data frame DR belongs.

Specific embodiments of method 100 according to the present invention may be implemented, for example, in software or hardware or in a mixed form made up of software and hardware.

Figure 7:
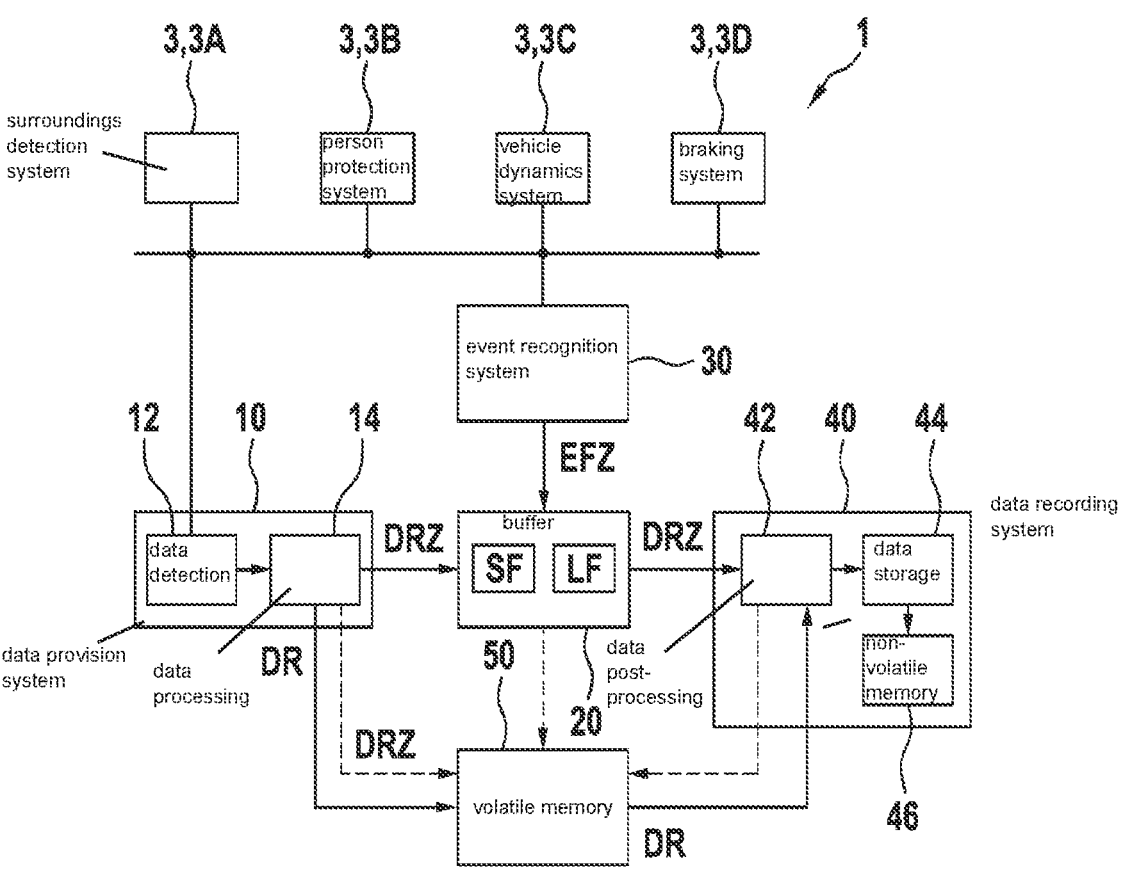
FIG. 7 shows a schematic block diagram of one exemplary embodiment of a device according to the present invention for carrying out the method according to the present invention for recording event data in a vehicle from FIG. 1.

As is apparent from FIG. 7, the illustrated exemplary embodiment of a device 1 according to the present invention for carrying out method 100 for recording event data in a vehicle includes a data provision system 10, a buffer block 20, an event recognition system 30, and a data recording system 40. Data provision system 10 continuously receives vehicle data, to be recorded, from at least one vehicle system 3 and writes them as event data into data frames DR having a predefined size, and stores individual data frames DR in at least one volatile memory 50. Buffer block 20 manages stored data frames DR, and keeps them available in the at least one volatile memory 50 until the event data stored in individual data frames DR are older than a predefined maximum pre-event point in time, or the stored data frames are persistently stored in at least one nonvolatile memory 46 in response to a predefined event that is recognized by event recognition system 30. Buffer block 20 includes a write function SF and multiple partitions 21, 21A, 21B having a predefined size. Write function SF determines, as a function of at least one write criterion, one of partitions 21, 21A, 21B as the present write partition, and writes pieces of reference information 25 of individual data frames DR received from data provision system 10 into the present write partition.

In addition, in the illustrated exemplary embodiment, buffer block 20 includes a read function LF. Read function LF determines one of the other partitions 21 as the present read partition in response to a request of data recording system 40 and as a function of at least one predefined read criterion, which includes at least one present event time window EZF for which the event data are to be persistently recorded, and reads pieces of reference information 25 from data frames DR contained in the present read partition and relays them to data recording system 40. Data recording system 40 persistently stores data frames DR corresponding to relayed pieces of reference information 25 in the at least one nonvolatile memory 46.

Furthermore, write function SF writes received pieces of reference information 25 of individual data frames DR into the write partition in an arbitrary temporal sequence, and ascertains and marks temporally randomly sorted subsequences of written pieces of reference information 25 of individual data frames DR in the at least one partition 21.

Event recognition system 30 continuously monitors the state of the vehicle, and decides when a predefined event has occurred that requires the persistent storage of the corresponding event data of the at least one vehicle system 3. Event recognition system 30 outputs to buffer block 20 present event time window EZF, corresponding to the recognized event, for which the event data are to be persistently recorded, a starting point in time of present event time window EZF not being chronologically prior to the maximum pre-event point in time.

In the illustrated exemplary embodiment, a first vehicle system 3 is designed as a surroundings detection system 3A. A second vehicle system 3 is designed as a person protection system 3B, a third vehicle system 3 is designed as a vehicle dynamics system 3C, and a fourth vehicle system is designed as a braking system 3D. Of course, even further vehicle data from other vehicle systems or from a different combination of above-mentioned vehicle systems 3 may also be detected and recorded.

Event recognition system 30 predefines starting point in time EZF_1 of present event time window EZF as a time stamp with regard to a present zero reference point in time B, and predefines ending point in time EZF_2 of present event time window EZF as a time difference from starting point in time EZF_1. Buffer block 20 redefines zero reference point in time B if necessary.

In the illustrated exemplary embodiment, data provision system 10 includes data detection 12 and data preprocessing 14, and transfers pieces of reference information 25 of data frames DR stored in the at least one volatile memory 50 to buffer block 20. In the illustrated exemplary embodiment, as stated above, pieces of reference information 25 of individual data frames DR include data frame indicators DRZ which include a memory space of the data blocks or data frames stored in the volatile memory, as well as corresponding time window 27 of data frame DR with starting time stamp 28 and ending time stamp 29. In the case of a recognized event, buffer block 20 relays corresponding pieces of reference information 25 from data frames, which are to be persistently stored in the at least one nonvolatile memory 46, to data recording system 40. In the illustrated exemplary embodiment, data recording system 40 includes data postprocessing 42, data storage 44, and the at least one nonvolatile memory 46. Individual data frames DR generally contain more than one data excerpt that has been generated or stored within time window 27 of data frame DR. Buffer block 20 knows only time window 27 of data frame DR, and does not know or understand the content of data frame DR. Buffer block 20 receives and relays data frames DR as referencing from data provision system 10 to data recording system 40. This means that buffer block 20 does not copy the memory content of data frames DR. If event recognition system 30 notifies buffer block 20 via a present event time window EZF, buffer block 20 identifies data frames DR that relate to present event time window EZF. Buffer block 20 then provides to the data recording precisely those pieces of reference information 25 of data frames DR of data recording system 40 that temporally overlap with present event time window EZF. This means that buffer block 20 relays complete pieces of reference information 25 from data frames DR to data recording system 40, even if data frames DR only partially overlap with present event time window EZF, and therefore some data excerpts may be outside present event time window EZF. Buffer block 20 relates only data frames DR, having a temporal overlap with present event time window EZF, to the occurred event. Buffer block 20 applies no further criteria in order to assign data frames DR to an event. Buffer block 20 provides data recording system 40 with precisely those pieces of reference information 25 from data frame DR that overlap with present event time window EZF. There are no limitations on the order in which buffer block 20 relays data frames DR to data recording system 40. Buffer block 20 in each case processes only one event at a point in time. Event recognition system 30 informs buffer block 20 only about present event time window EZF. Buffer block 20 requires no further knowledge of the circumstances or details of the event. If event recognition system 30 identifies a second event while buffer block 20 is already processing a present event time window EZF of a first event, event recognition system 30 may alter present event time window EZF. In addition, buffer block 20 has a statically configurable limit, i.e., known at the time of compiling, that indicates how many maximum time units prior to the present point in time a present event time window EZF may begin. This limit is referred to as the maximum pre-event point in time. Event recognition system 30 cannot change the start of present event time window EZF to a point in time that is chronologically prior to the maximum pre-event point in time. In addition, event recognition system 30 cannot establish a present event time window EZF that starts chronologically prior to the maximum pre-event point in time.

Thus, the behavior of buffer block 20 is indicated by present event time window EZF. If event recognition system 30 recognizes an event for which data must be continuously recorded, event recognition system 30 notifies buffer block 20 of present event time window EZF in question that corresponds to a time range for which data frames DR in question are to be persistently stored.

The end of present event time window EZF may be a point in time in the future. When further events are recognized, present event time window EZF may then change. This may be the case, for example, when initially a less important event is recognized, followed by a more serious event that is regarded as being related to the first event. One example could be that the vehicle recognizes crossing over the centerline of the roadway, i.e., an error in an automatic steering function of the vehicle, as event A, and an airbag control unit subsequently notifies event recognition system 30 of an airbag deployment as the result of a head-on collision, as event B. Event A alone may be regarded as relevant for recording the vehicle data in a first event time window EZF having a starting point in time EZF_1 that is 10 seconds prior to the occurrence of event A, and having an ending point in time EZF_2 that is 10 seconds after the occurrence of event A. Event B, which is much more serious than event A, may require recording of the vehicle data in a second event time window EZF having a starting point in time EZF_1 that is 30 seconds prior to the occurrence of event B, and having an ending point in time EZF_2 that is 30 seconds after the occurrence of event B. Thus, while the recording of the vehicle data for event A is still running, event recognition system 30 has changed present event time window EZF for recording the vehicle data for event B.

In the illustrated exemplary embodiment, buffer block 20, viewed from the outside, corresponds to a collection of indicators DRZ on data frames DR which buffer block 20 keeps for some time until buffer block 20 returns them to the memory management of the at least one volatile memory 50 or relays them to data recording system 40, which reads out data frames DR, corresponding to relayed indicators DRZ, from the at least one volatile memory 50 and persistently stores them in the at least one nonvolatile memory 46. The present write partition may mark buffer block 20, for example, with a write partition indicator in an atomic machine instruction. Internally, the buffer block includes a series of partitions 21, 21A, 21B. An individual partition 21, 21A, 21B corresponds, for example, to an array of data frame indicators DRZ that are enriched with several pieces of additional information 26 relating to time window 27 of corresponding data frame DR, and auxiliary information 60 that facilitates and speeds up the readout operation of reference information 25.

The size and also the number of partitions 21, 21A, 21B in buffer block 20 are statically configurable, i.e., known at the time of compiling. Buffer block 20 statically contains the memory area of partitions 21, 21A, 21B; i.e., buffer block 20 statically assigns partitions 21, 21A, 21B at the program start. The size and number of partitions 21, 21A, 21B may be configured in such a way that the number of data frame indicators DRZ is sufficient under all conditions. In addition to partitions 21, 21A, 21B that contain data frame indicators DRZ, buffer block 20 contains a materialized representation of present event time window EZF.

Data provision system 10 inserts data frames DR, i.e., pieces of reference information 25 of corresponding data frames DR, into buffer block 20, while data recording system 40 reads out pieces of reference information 25 of data frames DR from buffer block 20 and persistently stores associated data frames DR. Therefore, data provision system 10 is referred to here as a "writer," and data recording system 40 is referred to as a "reader." The writer and reader may call up processes of buffer block 20 from various runs simultaneously or in parallel, and the internal state of buffer block 20 of course remains correct in all possible simultaneous or parallel runs.

Buffer block 20 separates a write operation of write function SF from a read operation of read function LF via the exclusive possession of partitions 21, 21A, 21B. Buffer block 20 determines one of partitions 21, 21A, 21B as the present "write partition." Write function SF has exclusive possession of this present write partition. Read function LF can neither read nor alter the present write partition, even if the present write partition contains data frames DR that temporally overlap present event time window EZF. If write function SF has completely filled the present write partition with reference information 25, write function SF searches for a new present write partition, using determination operation 140 described above, and the previous write partition becomes accessible to read function LF.

When write function SF has determined the new present write partition, write function SF resets the write partition indicator of buffer block 20 according to an atomic storage operation. "Racing conditions," which may be caused by read function LF accessing an outdated cached version of the present write partition, for example in a CPU cache of another CPU core, are thus excluded.

Read function LF likewise possesses a partition 21, 21A, 21B that is determined as the present read partition. Naturally, the present read partition temporally overlaps with present event time window EZF; otherwise, read function LF would have no interest in contained data frames DR. As the result of the determination operation described above, without further means for separating the runs, write function SF will never access the present read partition. When read function LF has read out all pieces of reference information 25 of relevant data frames DR from the present read partition, time window 22 of the present read partition is then invalid because all data frames DR contained in the present read partition have been read out, or time window 22 of the present read partition no longer overlaps with present event time window EZF. Read function LF then searches for some other partition 21, 21A, 21B which overlaps with present event time window EZF and which is not the present write partition. When read function LF finds such a partition 21, 21A, 21B, due to the fact that the buffer block contains pieces of reference information 25 from multiple relevant data frames DR concerning the present event, read function LF then determines this partition 21, 21A, 21B for the new present read partition. Since write function SF never accesses the present read partition, it is also not necessary to atomically store the read partition indicator. In the overwhelming majority of the call-ups of buffer block 20, write function SF simply appends pieces of reference information 25 to a new data frame DR at the end of the present write partition, as the result of which time window 22 of the present write partition is possibly expanded. Likewise, read function LF simply reads pieces of reference information 25 concerning next data frame DR from the present read partition. Thus, write function SF and read function LF never interfere with one another. Only when the present write partition has been completely written or the present read partition has been completely read out can there be simultaneous accesses to partitions. However, these are write-protected read-only accesses that compare time windows 22 of partitions 21, 21A, 21B to one another. The read operations and write operations are properly separated from one another at any time due to the definition of a new exclusive read partition or a new exclusive write partition.

There may be more than one call-up of write function SF. To avoid racing conditions due to two call-ups that simultaneously want to define a new present write partition or overwrite status information within the present write partition, all accesses to buffer block 20 by a call-up of write function SF are carried out only with exclusive possession of a lock. For only a single write function SF, this lock is always available in a single atomic read operation. Otherwise, a second call-up must wait until presently active write function SF has released this lock. Since the actions carried out using the lock are very fast, this is the better approach, compared to individually introducing a separate present write partition for each call-up of write function SF. It should be noted that neither read function LF nor event recognition system 30 ever has to acquire this lock. This means that this lock results in waiting cycles only if there are two call-ups, in order to simultaneously insert in each case pieces of reference information 25 of a new data frame DR into buffer block element 20 via write function SF.

The event recognition may be carried out in a separate run in event recognition system 30. Event recognition system 30 does not interact directly with the processing of data frames DR. However, event recognition system 30 may at any time set, alter, or invalidate the present event time window stored in buffer block 20. Write function SF reads present event time window EZF during the search for a new write partition. Although the simultaneous access of the present event time window by event recognition system 30 and write function SF is "only" a read/write conflict, buffer block 20 ensures that write function SF does not read partially written and thus arbitrarily corrupted present event time window EZF while event recognition system 30 is altering present event time window EZF. If there is more than one call-up of write function SF, only one of them can have acquired the described exclusive lock. Therefore, only one write function SF may be in conflict with event recognition system 30 for the simultaneous access to present event time window EZF while other call-ups attempt to obtain the lock. Buffer block 20 resolves the conflict between event recognition system 30 and write function SF by storing present event time window EZF as an atomic value, i.e., in a single machine instruction. Therefore, event recognition system 30 writes new present event time window EZF in an individual atomic operation. Write function SF reads either old present event time window EZF or new present event time window EZF, but never reads a corrupted, partially written present event time window EZF.

In the search for a new write partition, write function SF initially creates a run-localized copy of present event time window EZF with the aid of an atomic read operation. Write function SF subsequently operates only with the run-localized copy until a new write partition is found. It is thus possible for write function SF to search for a new write partition with the aid of an outdated present event time window EZF. However, this behavior is identical to the case that write function SF initially updates the write partition, and event recognition system 30 subsequently alters present event time window EZF.

The same as with the described read/write conflict between event recognition system 30 and write function SF, read function LF also has a read/write conflict with event recognition system 30 for accesses to present event time window EZF of buffer block 20. Read function LF must know present event time window EZF in order to find a partition 21, 21A, 21B that contains data frames DR that overlap with present event time window EZF, and must know if this partition 21, 21A, 21B is not completely contained in present event time window EZF in order to identify or determine relevant data frames DR within this partition.

Of course, read function LF does not read a partially written, corrupted present event time window EZF while event recognition system 30 is simultaneously altering present event time window EZF.

As stated above, event recognition system 30 atomically updates present event time window EZF. Likewise, read function LF atomically reads present event time window EZF at the beginning of each process call-up of buffer block 20 and stores it in a run-localized copy. While the readout operation is being carried out, read function LF uses this copy wherever present event time window EZF is needed.

It is possible for present event time window EZF stored in buffer block 20 to differ from the run-localized copy of read function LF. Read function LF ends the present readout operation with present event time window EZF that has become outdated in the meantime, and thus relays to data recording system 40, at the most, pieces of reference information 25 from a data frame DR whose time window 22 is outside present event time window EZF. However, this behavior is as if event recognition system 30 had not established new present event time window EZF until after read function LF processed this data frame DR, and is therefore tolerable.

At the beginning of each call-up of buffer block 20, read function LF not only creates a run-localized copy of present event time window EZF, but also checks whether present event time window EZF has changed since the previous call-up. If present event time window EZF has changed, read function LF initially checks whether the present read partition still overlaps with the new present event time window. If this is not the case, read function LF searches for a new present read partition, as described above. If the present read partition still overlaps with new present event time window EZF, read function LF starts the readout operation anew, and once again starts to read the present read partition from the beginning.

What is claimed is:

1. A method for recording event data in a vehicle, the method comprising:

continuously receiving vehicle data from at least one vehicle system;

writing the received vehicle data as event data into data frames having a predefined size; and storing individual ones of the data frames in at least one volatile memory, the stored individual data frames being managed and kept available in the at least one volatile memory until the event data stored in the individual data frames are older than a predefined maximum pre-event point in time, or persistently storing individual ones of the data frames in at least one nonvolatile memory in response to a recognized predefined event, the storing or persistently storing including:

providing multiple partitions having a predefined size, determining one of the partitions, as a function of at least one write criterion, as a present write partition, and writing received pieces of reference information of the individual data frames into the present write partition, determining another of the partitions as a present read partition in response to a request and as a function of at least one predefined read criterion, which includes at least one present event time window for which the event data are to be persistently recorded, reading out and relaying pieces of reference information from data frames contained in the present read partition, containing the event data to be persistently recorded, persistently storing the data frames corresponding to the relayed pieces of reference information in the at least one nonvolatile memory, wherein the multiple partitions in the volatile memory each have a defined time window based on starting and ending time stamps of the stored data frames, and wherein the partitions are managed based on overlap with the present event time window to determine the present write partition and the present read partition.

2. The method as recited in claim 1, wherein the writing of the event data and the reading of the pieces of reference information occur simultaneously or in parallel.

3. The method as recited in claim 2, wherein a starting point in time of the present event time window is predefined as a time stamp with regard to a present zero reference point in time, and an ending point in time of the present event time window is predefined as a time difference from the starting point in time, it being possible to redefine the present zero reference point in time when necessary.

4. The method as recited in claim 3, wherein an oldest zero reference point in time corresponds to a starting point in time of the vehicle.

5. The method as recited in claim 3, wherein the present zero reference point in time is redefined when a new present event time window is not representable by the present zero reference point in time due to the fact that the starting point in time of the new present event time window is temporally too far from the present zero reference point in time.

6. The method as recited in claim 1, wherein the individual data frames relate to a time window, the pieces of reference information of the individual data frames each include a corresponding memory area, and a corresponding time window with a starting time stamp and an ending time stamp of the individual data frames in which at least one data segment of the event data contained in the corresponding data frame has been generated or detected.

7. The method as recited in claim 6, wherein the starting time stamp and the ending time stamp of the individual data frames are based on a present zero reference point in time.

8. The method as recited in claim 6, wherein a time window is assigned to each of the partitions, for each partition, an oldest starting time stamp of pieces of reference information of a corresponding data frame contained in the partition being used as the starting time stamp of the time window of the partition, and a most recent ending time stamp of pieces of reference information of a corresponding data frame contained in the partition being used as the ending time stamp of the time window of the partition.

9. The method as recited in claim 8, wherein the pieces of reference information from at least one data frame whose time window overlaps with the present event time window is read out from the present read partition, and the time window of the at least one data frame in the pieces of reference information is invalidated after the pieces of reference information are read out.

10. The method as recited in claim 9, wherein the present event time window is locally stored prior to determining the present read partition, prior to each operation of reading out the pieces of reference information from at least one data frame, the locally stored present event time window is compared to the present event time window, and the present event time window is locally stored when it differs from the locally stored present event time window, it being checked whether the time window of the present read partition and the present event time window overlap when the locally stored present event time window has been altered, and the reading out of the present read partition being restarted when the present read partition overlaps with the altered present event time window, or a new present read partition is determined when the present read partition does not overlap with the altered present event time window.

11. The method as recited in claim 1, wherein as a function of the at least one predefined write criterion, a new write partition is searched for when the vehicle is restarted or the present write partition is completely written with reference information.

12. The method as recited in claim 11, wherein a set of partitions that have no valid time window, or that have a valid time window which in its entirety is older than the maximum pre-event point in time and does not overlap an existing present event time window, is determined, a partition of the set of partitions that has no valid time window, or a partition of the set of petitions whose corresponding valid time window has an oldest starting time stamp, being determined as the present write partition.

13. The method as recited in claim 12, wherein the existing present event time window is locally stored prior to determining the present write partition.

14. The method as recited in claim 1, wherein the received pieces of reference information of the individual data frames are written into the present write partition in an arbitrary temporal sequence, temporally randomly sorted subsequences of the written pieces of reference information of the individual data frames in the write partition being ascertained and marked.

15. The method as recited in claim 14, wherein the written pieces of reference information of the individual data frames are consecutively numbered in ascending order according to their write sequence.

16. The method as recited in claim 15, wherein with each writing of pieces of reference information of a new data frame, a time window of the new data frame is compared to the time window of the data frame whose pieces of reference information have previously been last written into the present write partition.

23

17. The method as recited in claim 16, wherein a starting time stamp of the new data frame is compared to a starting time stamp of a last written data frame, a temporally randomly sorted present start time subsequence being recognized and continued when the starting time stamp of the new data frame is more recent than the starting time stamp of the last written data frame, or a new start time subsequence is started, and its starting time stamp is marked by storing a corresponding numbering of the new data frame when the starting time stamp of the new data frame is older than the starting time stamp of a last written data frame, and a first start time subsequence starting with the starting time stamp of a first written data frame and a lowest number of the corresponding numbering.

18. The method as recited in claim 17, wherein pieces of reference information from at least one data frame to be read out from the present read partition are ascertained for the present event time window as a function of a temporal reference of the at least one temporally randomly sorted start time subsequence and/or the at least one temporally randomly sorted end time subsequence of the present read partition.

19. The method as recited in claim 16, wherein an ending time stamp of the new data frame is compared to an ending time stamp of a last written data frame, a temporally randomly sorted present end time subsequence being recognized and continued when the ending time stamp of the new data frame is more recent than the ending time stamp of the last written data frame, or a new end time subsequence is started, and its ending time stamp is marked by storing a corresponding numbering of the new data frame when the ending time stamp of the new data frame is older than the ending time stamp of the last written data frame, and a first end time subsequence starts with the ending time stamp of a first written data frame and a lowest number of the corresponding numbering.

20. A device for recording event data in a vehicle, comprising:
  a data provision system;
  a buffer block;
  an event recognition system; and
  a data recording system;
  wherein:
    the data provision system is configured to continuously receive vehicle data, to be recorded, from at least one vehicle system, write the vehicle data as event data into data frames having a predefined size, and store individual data frames in at least one volatile memory;
    the buffer block is configured to manage the stored data frames and keep them available in the at least one volatile memory until the event data stored in individual ones of the data frames are older than a predefined maximum pre-event point in time, or to persistently store them in at least one nonvolatile memory in response to a predefined event that is recognized by the event recognition system, the buffer block including a write function and multiple partitions having a predefined size, the write function being configured to determine, as a function of at least one write criterion, one of the partitions as a present write partition, and to write pieces of reference information of the individual data frames that are received from the data provision system into the present write partition, and the buffer block includes a read function, the read function being configured to determine another one of the other partitions as a present read partition in response to a request of the data recording system and as a function of at least one predefined read criterion that includes at least one present event time window for which the event data are to be persistently recorded, and to read out pieces of reference information from data frames contained in the present read partition, containing event data to be persistently recorded, and relay them to the data recording system, and
  the data recording system is configured to persistently store data frames, corresponding to the relayed pieces of reference information, in the at least one nonvolatile memory,
  wherein the multiple partitions in the volatile memory each have a defined time window based on starting and ending time stamps of the stored data frames, and wherein the partitions are managed based on overlap with the present event time window to determine the present write partition and the present read partition.

21. The device as recited in claim 20, wherein the write function and the read function run simultaneously or in parallel.

22. The device as recited in claim 20, wherein the write function (SF) is further configured to write the received pieces of reference information of the individual data frames into the present write partition in an arbitrary temporal sequence, and to ascertain and mark temporally randomly sorted subsequences of the written pieces of reference information of the individual data frames in the present write partition.

23. The device as recited in claim 20, wherein the event recognition system is configured to continuously monitor a state of the vehicle and to decide when a predefined event has occurred that requires the persistent storage of corresponding event data of the at least one vehicle system, the event recognition system being further configured to output the present event time window, corresponding to the recognized event for which the event data are to be persistently recorded, to the buffer block, a starting point in time of the present event time window not being chronologically prior to a maximum pre-event point in time.

24. The device as recited in claim 20, wherein the at least one vehicle system includes a surroundings detection system and/or a person protection system and/or a vehicle dynamics system and/or a braking system.

25. The device as recited in claim 24, wherein the event recognition system is further configured to predefine a starting point in time of the present event time window as a time stamp with regard to a present zero reference point in time, and to predefine an ending point in time of the present event time window as a time difference from the starting point in time, and the buffer block is configured to redefine the present zero reference point in time when necessary.

26. The device as recited in claim 20, wherein the data provision system and/or the buffer block and/or the event recognition system and/or the data recording system, is distributed over multiple devices in the vehicle that communicate with one another via a vehicle network structure.

27. A non-transitory computer-readable memory medium on which is stored a computer program for recording event data in a vehicle, the computer program, when executed by one or more computers, causing the one or more computers to perform:
  continuously receiving vehicle data from at least one vehicle system;

writing the received vehicle data as event data into data frames having a predefined size; and storing individual ones of the data frames in at least one volatile memory, the stored individual data frames being managed and kept available in the at least one volatile memory until the event data stored in the individual data frames are older than a predefined maximum pre-event point in time, or persistently storing individual ones of the data frames in at least one nonvolatile memory in response to a recognized predefined event, the storing or persistently storing including:

providing multiple partitions having a predefined size, determining one of the partitions, as a function of at least one write criterion, as a present write partition, and writing received pieces of reference information of the individual data frames into the present write partition, determining another of the partitions as a present read partition in response to a request and as a function of at least one predefined read criterion, which includes at least one present event time window for which the event data are to be persistently recorded, reading out and relaying pieces of reference information from data frames contained in the present read partition, containing the event data to be persistently recorded, persistently storing the data frames corresponding to the relayed pieces of reference information in the at least one nonvolatile memory, wherein the multiple partitions in the volatile memory each have a defined time window based on starting and ending time stamps of the stored data frames, and wherein the partitions are managed based on overlap with the present event time window to determine the present write partition and the present read partition.

\* \* \* \* \*